US011735988B2

(12) United States Patent
Zatorski et al.

(10) Patent No.: US 11,735,988 B2
(45) Date of Patent: Aug. 22, 2023

(54) DUAL ROTOR ELECTRIC MACHINE

(71) Applicant: General Electric Company, Schenectady, NY (US)

(72) Inventors: Darek Tomasz Zatorski, Fort Wright, KY (US); Jia Xiaochuan, Centerville, OH (US); Kurt David Murrow, Springboro, OH (US)

(73) Assignee: General Electric Company, Schenectady, NY (US)

(*) Notice: Subject to any disclaimer, the term of this patent is extended or adjusted under 35 U.S.C. 154(b) by 523 days.

(21) Appl. No.: 16/691,975

(22) Filed: Nov. 22, 2019

(65) Prior Publication Data

US 2020/0251970 A1 Aug. 6, 2020

Related U.S. Application Data

(60) Provisional application No. 62/799,433, filed on Jan. 31, 2019.

(51) Int. Cl.
| | |
|---|---|
| *H02K 16/02* | (2006.01) |
| *B64C 27/10* | (2023.01) |
| *B64D 27/24* | (2006.01) |
| *H02K 5/173* | (2006.01) |
| *H02K 5/18* | (2006.01) |
| *H02K 7/08* | (2006.01) |

(Continued)

(52) U.S. Cl.
CPC ........... *H02K 16/025* (2013.01); *B64C 27/10* (2013.01); *B64D 27/24* (2013.01); *H02K 5/1737* (2013.01); *H02K 5/18* (2013.01); *H02K 5/203* (2021.01); *H02K 7/088* (2013.01); *H02K 13/003* (2013.01); *B64D 2221/00* (2013.01); *H02K 9/19* (2013.01)

(58) Field of Classification Search
CPC ...... B64C 27/10; H02K 13/003; H02K 16/00; H02K 16/02; H02K 16/025; H02K 5/1737; H02K 5/18; H02K 5/20; H02K 7/088; H02K 9/19
USPC .................................. 310/112–114, 154.33
See application file for complete search history.

(56) References Cited

U.S. PATENT DOCUMENTS

| 3,933,324 A | 1/1976 | Ostrowski |
| 4,589,611 A | 5/1986 | Ramme et al. |

(Continued)

FOREIGN PATENT DOCUMENTS

| EP | 2128403 A2 | 12/2009 |
| EP | 3305665 A1 | 4/2018 |

(Continued)

OTHER PUBLICATIONS

European Search Report Corresponding to Application No. 20151856 dated Jun. 8, 2020.

*Primary Examiner* — Rashad H Johnson
(74) *Attorney, Agent, or Firm* — Dority & Manning, P.A.

(57) ABSTRACT

An electric machine for a drive system having a first DS rotor and a second DS rotor includes a first EM rotor rotatable about an axis in a first circumferential direction and including a plurality of magnets, the first EM rotor configured for mechanical coupling to the first DS rotor; and a second EM rotor rotatable about the axis in a second circumferential direction and including a plurality of windings, the second EM rotor configured for mechanical coupling to the second DS rotor and the plurality of magnets of the first EM rotor operably engaged with the plurality of windings of the second EM rotor.

19 Claims, 11 Drawing Sheets

(51) Int. Cl.
  H02K 13/00 (2006.01)
  H02K 5/20 (2006.01)
  H02K 9/19 (2006.01)

(56) References Cited

U.S. PATENT DOCUMENTS

| | | | |
|---|---|---|---|
| 4,965,477 A * | 10/1990 | Stadler | H02K 7/1807 |
| | | | 310/90 |
| 8,008,822 B2 | 8/2011 | Hopewell et al. | |
| 8,042,763 B2 | 10/2011 | Ariton et al. | |
| 9,199,729 B1 | 12/2015 | Uebori et al. | |
| 9,214,848 B2 * | 12/2015 | Yamaguchi | H02K 11/225 |
| 9,434,471 B2 | 9/2016 | Arlton et al. | |
| 10,086,932 B2 | 10/2018 | Eller et al. | |
| 10,116,187 B1 * | 10/2018 | Wishart | H02K 7/14 |
| 10,513,986 B2 | 12/2019 | Auker et al. | |
| 2006/0071575 A1 * | 4/2006 | Jansen | H02K 5/207 |
| | | | 290/55 |
| 2007/0145751 A1 * | 6/2007 | Roos | F03B 13/105 |
| | | | 290/52 |
| 2008/0024035 A1 | 1/2008 | Aydin et al. | |
| 2009/0015011 A1 * | 1/2009 | Colin | H02K 7/1823 |
| | | | 60/774 |
| 2010/0127496 A1 * | 5/2010 | Burkholder | F02C 7/32 |
| | | | 290/46 |
| 2013/0126669 A1 * | 5/2013 | Hamann | B64D 27/24 |
| | | | 244/60 |
| 2015/0122941 A1 | 5/2015 | Harrigan | |
| 2015/0291276 A1 * | 10/2015 | Zatorski | F02C 6/206 |
| | | | 415/68 |
| 2016/0149469 A1 * | 5/2016 | Lemmers | F01D 25/20 |
| | | | 290/1 A |
| 2017/0283042 A1 | 10/2017 | Gamble | |
| 2018/0051702 A1 * | 2/2018 | Kupiszewski | F02C 3/04 |
| 2018/0269760 A1 * | 9/2018 | Palmer | H02K 1/2795 |
| 2019/0085701 A1 * | 3/2019 | Pankaj | F02C 7/36 |
| 2019/0085715 A1 * | 3/2019 | van der Merwe | F01D 1/24 |
| 2019/0085720 A1 * | 3/2019 | Pankaj | F02C 7/36 |
| 2019/0085725 A1 * | 3/2019 | Zatorski | F02C 7/06 |
| 2019/0383157 A1 * | 12/2019 | Kupratis | F02K 3/06 |
| 2020/0023982 A1 * | 1/2020 | Kupratis | B60L 50/61 |
| 2020/0063606 A1 * | 2/2020 | Miller | F02K 5/00 |
| 2020/0067383 A1 * | 2/2020 | Hon | H02P 9/12 |
| 2020/0070990 A1 * | 3/2020 | Harvey | B64D 27/00 |
| 2020/0102849 A1 * | 4/2020 | Kupratis | F01D 17/162 |
| 2020/0127532 A1 * | 4/2020 | Dlala | H02K 1/276 |
| 2020/0227988 A1 * | 7/2020 | Zhu | B64C 11/46 |
| 2020/0251970 A1 * | 8/2020 | Zatorski | H02K 5/203 |
| 2020/0373873 A1 * | 11/2020 | Houshmand | H02K 15/125 |
| 2021/0114448 A1 * | 4/2021 | Meyer | H02K 9/197 |

FOREIGN PATENT DOCUMENTS

| | | |
|---|---|---|
| JP | 2010/166717 A | 7/2010 |
| WO | WO2014/171224 A1 | 10/2014 |

* cited by examiner

DUAL ROTOR ELECTRIC MACHINE

PRIORITY INFORMATION

The present application claims priority to U.S. Provisional Patent Application Ser. No. 62/799,433 filed on Jan. 31, 2019, which is incorporated by reference herein.

FIELD

The present subject matter relates generally to a counter-rotating electric machine, and a method for operating the same.

BACKGROUND

Electric machines, and more particularly, electric motors, generally include a rotor and stator. During operation, electrical energy may be transferred to one or more windings of the stator of the electric machine which, when energized, drive one or more magnets on the rotor of the electric machine, converting the electrical energy received to a mechanical output.

Certain vehicles include counterrotating rotary components. For example, at least certain helicopters include counterrotating main lift rotors for generating a vertical lift for the helicopter. Traditionally, these counterrotating main lift rotors are driven by a turboshaft engine through a mechanical gearing system.

The inventors of the present disclosure have found that it may be beneficial to incorporate one or more electric machines to drive the counterrotating main lift rotors of the helicopter, or to otherwise integrate one or more electric machines in counterrotating rotary components of a drive system for, e.g., a vehicle. One option for integrating one or more electric machines in such counterrotating components would be to include two separate electric machines, with each including a rotor coupled to a respective one of the counterrotating components. However, the inventors of the present disclosure have further found that such may lead to an increase in weight of the one or more electric machines, and further may not provide a desired rotational speed of the one or more electric machines for a desired efficiency.

Accordingly, the inventors of the present disclosure have found that an improved integration of one or more electric machines in counterrotating components of a drive system for e.g., a vehicle, an engine of a vehicle, etc. would be useful.

BRIEF DESCRIPTION

Aspects and advantages of the invention will be set forth in part in the following description, or may be obvious from the description, or may be learned through practice of the invention.

In one exemplary embodiment of the present disclosure, an electric machine is provided for a drive system (DS) having a first DS rotor and a second DS rotor. The electric machine (EM) defining an axis and including a first EM rotor rotatable about the axis in a first circumferential direction and including a plurality of magnets, the first EM rotor configured for mechanical coupling to the first DS rotor; and a second EM rotor rotatable about the axis in a second circumferential direction and including a plurality of windings, the second EM rotor configured for mechanical coupling to the second DS rotor and the plurality of magnets of the first EM rotor operably engaged with the plurality of windings of the second EM rotor.

In certain exemplary embodiments the plurality of magnets and the plurality of windings are aligned along the axis of the electric machine.

In certain exemplary embodiments the electric machine further defines a radial direction, and wherein the plurality of magnets of the first EM rotor are positioned inward of the plurality of windings of the second EM rotor along the radial direction.

In certain exemplary embodiments the electric machine further defines a radial direction, and wherein the electric machine further includes a casing located outward of the first EM rotor and the second EM rotor along the radial direction and at least partially surrounding the first EM rotor and the second EM rotor.

For example, in certain exemplary embodiments the electric machine further includes a bearing assembly positioned between the casing and the second EM rotor for supporting a rotation of the second EM rotor in the second circumferential direction relative to the casing.

For example, in certain exemplary embodiments the second EM rotor includes a plurality of airflow features for generating an airflow between the second EM rotor and the casing during operation of the electric machine.

In certain exemplary embodiments the electric machine further includes an electric bus; and a slip ring electrically coupling the plurality of windings of the second EM rotor to the electric bus.

In certain exemplary embodiments the electric machine further includes a first differential bearing positioned between the first EM rotor and the second EM rotor at a first position along the axis; and a second differential bearing positioned between the first EM rotor and the second EM rotor at a second position along the axis, wherein the first position and the second position are on opposite sides of the plurality of magnets and the plurality of windings from one another.

In certain exemplary embodiments the drive system is a vehicle drive system for a vehicle, wherein the vehicle is a helicopter, wherein the first DS rotor is a first main rotor of the helicopter, wherein the second DS rotor is a second main rotor of the helicopter, and wherein the electric machine is configured as an electric motor for substantially completely driving the first and second main rotors of the helicopter.

In certain exemplary embodiments the electric machine further includes a thermal management feature coupled to the first EM rotor or the second EM rotor.

In certain exemplary embodiments the electric machine further includes a cooling oil system including a stationary to rotating junction for providing a cooling oil flow to the second EM rotor.

In certain exemplary embodiments the electric machine further includes the electric machine is an electric motor configured to drive the first DS rotor in the first circumferential direction and the second DS rotor in the second circumferential direction.

In certain exemplary embodiments the first circumferential direction is opposite the second circumferential direction.

In certain exemplary embodiments the first circumferential direction is the same as the second circumferential direction.

In an exemplary aspect of the present disclosure, a method of operating an electric machine for a drive system having a first DS rotor and a second DS rotor is provided. The method includes rotating a first EM rotor of the electric machine in a first circumferential direction, the first EM rotor coupled to the first DS rotor and including a plurality of magnets; rotating a second EM rotor of the electric machine in a second circumferential direction, the second EM rotor coupled to the second DS rotor and including a plurality of windings; and transferring electrical power to or from the electric machine as a result of rotating the first EM rotor in the first circumferential direction and rotating the second EM rotor in the second circumferential direction.

In certain exemplary aspects rotating the first EM rotor in the first circumferential direction includes driving the first DS rotor with the first EM rotor in the first circumferential direction, and wherein rotating the second EM rotor in the second circumferential direction includes driving the second DS rotor with the second EM rotor in the second circumferential direction.

In certain exemplary aspects rotating the first EM rotor in the first circumferential direction includes driving the first EM rotor with the first DS rotor in the first circumferential direction, and wherein rotating the second EM rotor in the second circumferential direction includes driving the second EM rotor with the second DS rotor in the second circumferential direction.

In certain exemplary aspects rotating the first EM rotor in the first circumferential direction includes driving the first DS rotor with the first EM rotor in the first circumferential direction, and wherein rotating the second EM rotor in the second circumferential direction includes driving the second EM rotor with the second DS rotor in the second circumferential direction.

In certain exemplary aspects rotating the first EM rotor in the first circumferential direction includes driving the first EM rotor with the first DS rotor in the first circumferential direction, and wherein rotating the second EM rotor in the second circumferential direction includes driving the second DS rotor with the second EM rotor in the second circumferential direction.

In certain exemplary aspects the method further includes receiving data indicative of an operability parameter of a vehicle incorporating the drive system; and controlling a component of the vehicle in response to the data received to vary a rotational speed of the first EM rotor relative to the second EM rotor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
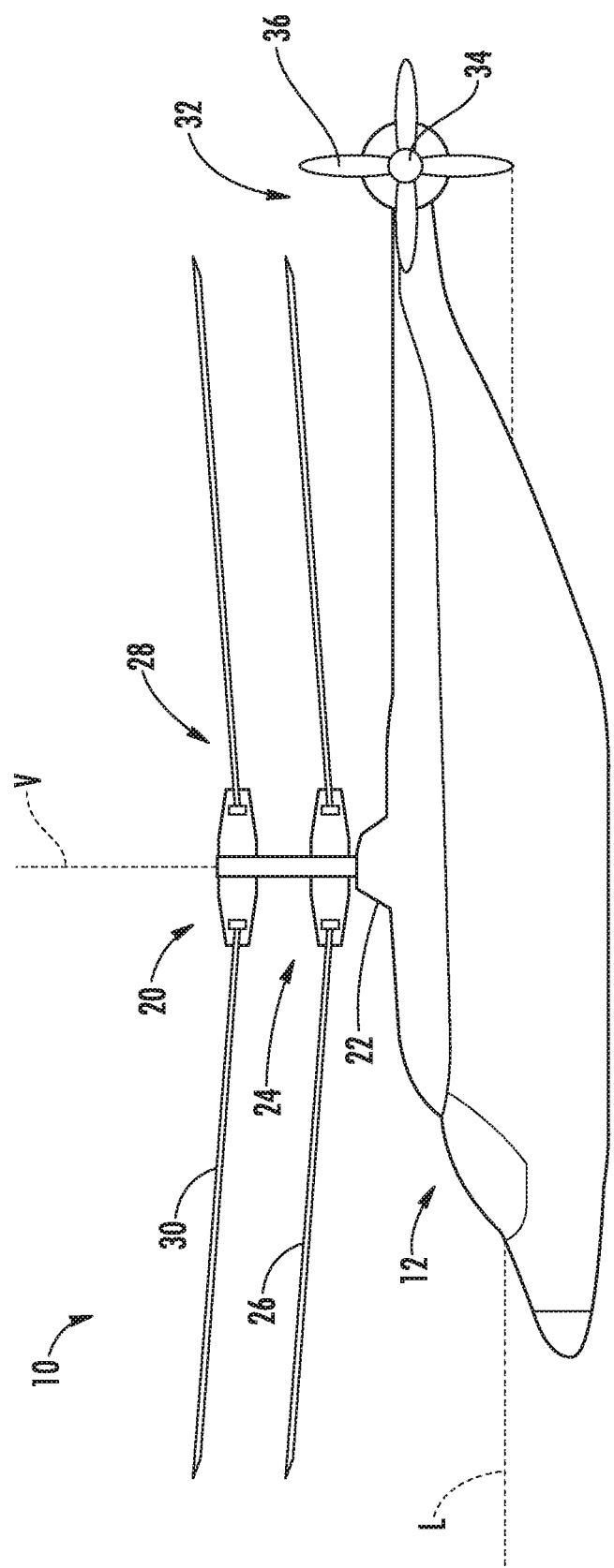
FIG. 1 is a schematic cross-sectional view of an aircraft in accordance with one embodiment of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 provides a perspective view of an exemplary aircraft 10 in accordance with the present disclosure. The aircraft 10 defines an orthogonal coordinate system, including three orthogonal coordinate axes. More specifically, the three orthogonal coordinate axes include a lateral axis L, a transverse axis (not shown), and a vertical axis V. In operation, the aircraft 10 may move along or around at least one of the lateral axis L, the transverse axis, and the vertical axis V.

The aircraft 10 includes an airframe 12, a drive system having a main rotor assembly 20, and a tail rotor assembly 30. The main rotor assembly 20 of the drive system includes a main rotor hub 22, a first rotor assembly 24 having a first plurality of main rotor blades 26, and a second rotor assembly 28 having a second plurality of main rotor blades 30. As will be appreciated from the description below, the main rotor hub 22 may include an electric machine in accordance with an exemplary embodiment of the present disclosure for substantially completely driving the first and second pluralities of rotor blades 26, 30, e.g., in opposite circumferential directions.

Referring still to FIG. 1, the tail rotor section 32 includes a tail rotor hub 34 and a plurality of tail rotor blades 36. Each tail rotor blade 36 extends outward from the tail rotor hub 34. In particular, rotation of the main rotor blades 26, 30 may generate lift for the aircraft 10, while rotation of the tail rotor blades 36 may generate thrust and counteract torque exerted on the airframe 12 by the main rotor blades 26, 30.

It should be appreciated that although a particular helicopter has been illustrated and described, other configurations and/or aircraft may be provided, and further, as will be described in more detail below, aspects of the present disclosure may be incorporated into other aeronautical vehicles, land-based vehicles, aquatic vehicles, stationary machines (e.g., power generating turbines), etc.

Figure 2:
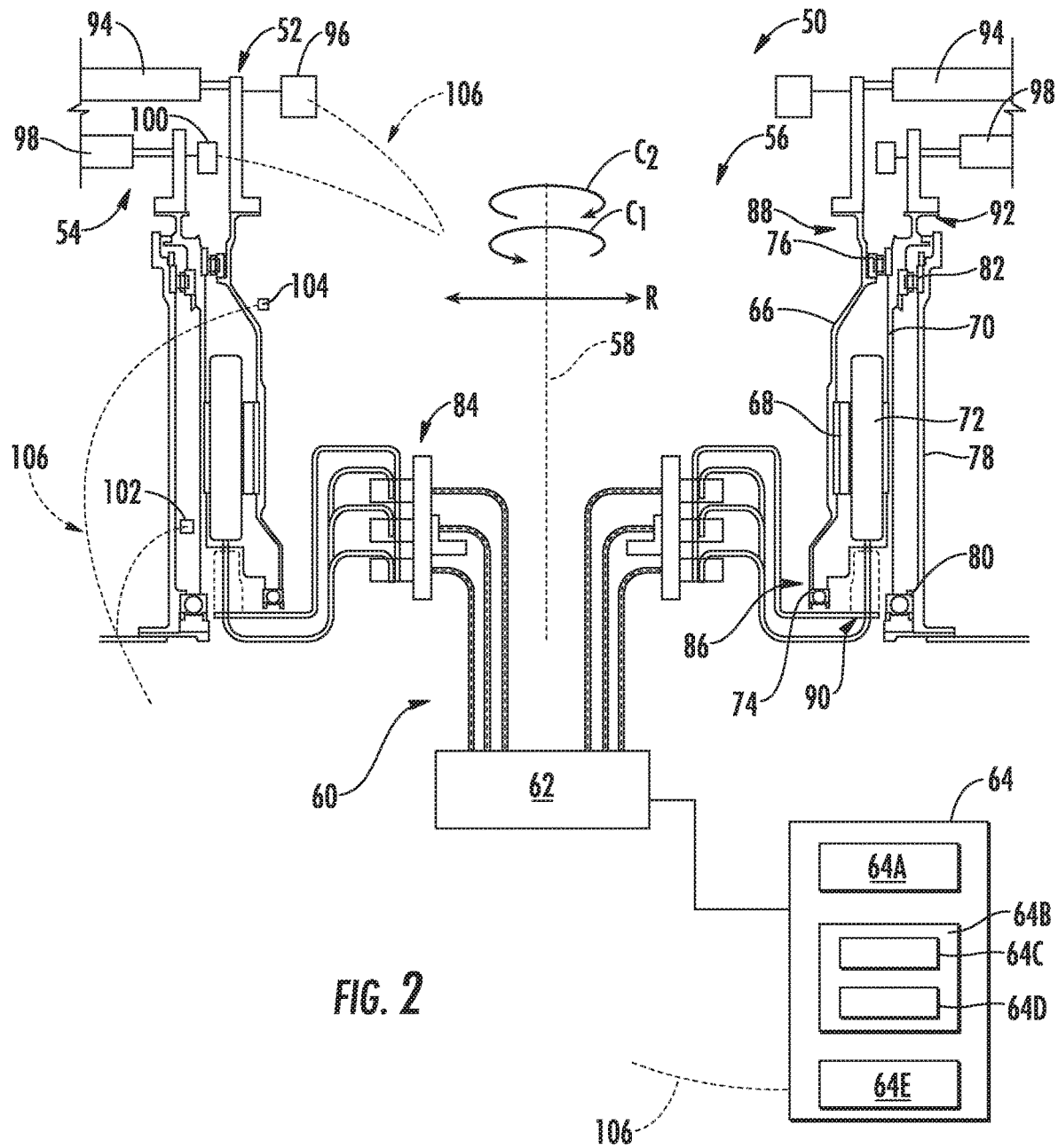
FIG. 2 is a schematic view of a drive system in accordance with an exemplary embodiment of the present disclosure.

Referring now to FIG. 2, a schematic view is provided of certain exemplary aspects of a drive system 50 of a vehicle in accordance with an exemplary embodiment of the present disclosure. In at least certain exemplary embodiments, the drive system 50 depicted schematically in FIG. 2 may be incorporated into the helicopter/aircraft 10 described above with reference to FIG. 1. For example, as is depicted schematically, the drive system 50 includes a first DS rotor 52 and a second DS rotor 54. In certain embodiments, the first DS rotor 52 may be the first rotor assembly 24 of the aircraft 10 and the second DS rotor 54 may be the second rotor assembly 28 of the aircraft 10. However, as will be explained below, in other embodiments, the first and second DS rotors 52, 54 may be incorporated into any other suitable drive system 50.

As will be appreciated, the vehicle drive system 50 generally includes an electric machine 56. The electric machine 56 defines an axis 58 extending longitudinally therethrough, a radial direction R extending outward from the axis 58 and a circumferential direction extending about the axis 58 (denoted generally as "C" herein, shown as directions "C1" and "C2" in FIG. 2). As will be explained in greater detail below, the drive system 50 further includes an electric bus 60, a power source 62 coupled to the electric machine 56 via the electric bus 60, and a controller 64.

Referring particularly to the electric machine 56, the electric machine 56 generally includes a first EM rotor 66 rotatable about the axis 58 in a first circumferential direction C1 and including a plurality of magnets 68. The electric machine 56 also includes a second EM rotor 70 rotatable about the axis 58 in a second circumferential direction C2 and including a plurality of windings 72. The plurality of magnets 68 of the first EM rotor 66 are operably engaged with the plurality of windings 72 of the second EM rotor 70 to facilitate the conversion of electrical power to mechanical power or vice versa. More specifically, it will be appreciated that the plurality of magnets 68 of the first EM rotor 66 and the plurality of windings 72 of the second EM rotor 70 are aligned along the axis 58 of the electric machine 56 (e.g., overlapping) and together define an airgap therebetween (not labeled).

It will be appreciated that the plurality of magnets 68 of the first EM rotor 66 and the plurality of windings 72 of the second EM rotor 70 may have any suitable configuration to facilitate operation of the electric machine 56. For example, the plurality of magnets 68 and the plurality of windings 72 may be configured such that the electric machine 56 is a synchronous electric machine, an asynchronous electric machine, an induction electric machine, an alternating current electric machine, a direct current electric machine, etc.

More specifically, for the embodiment depicted, the plurality of magnets 68 is a plurality of permanent magnets. Further, it will be appreciated that the plurality of magnets 68 of the first EM rotor 66 is positioned inward of the plurality of windings 72 of the second EM rotor 70 along the radial direction R of the electric machine 56. In such a manner, the electric machine 56 may be referred to as an indo-permanent magnet electric machine. Notably, however, in other embodiments the arrangement may be reversed, such that the plurality of magnets 68 of the first EM rotor 66 may be positioned outward of the plurality of windings 72 of the second EM rotor 70, such that the electric machine 56 may be referred to as an exo-permanent magnet electric machine 56 (see, e.g., FIG. 6, below).

Further, for the embodiment shown, the first EM rotor 66 is rotatably supported by the second EM rotor 70 through a differential bearing assembly. The differential bearing assembly includes a first differential bearing 74 positioned between the first EM rotor 66 and the second EM rotor 70 at a first position along the axis 58, as well as a second differential bearing 76 positioned between the first EM rotor 66 and the second EM rotor 70 at a second position along the axis 58. The first position and second position are on opposite sides of the plurality of magnets 68 and the plurality of windings 72 from one another along the axis 58. One of the first differential bearing 74 or second differential bearing 76 is configured as a ball bearing and the other of the first differential bearing 74 or second differential bearing 76 is configured as a roller bearing. More specifically, for the embodiment shown, the first differential bearing 74 is a ball bearing and the second differential bearing 76 is a roller bearing.

The exemplary electric machine 56 further includes a casing 78 located outward of the first EM rotor 66 and the second EM rotor 70 along the radial direction R and at least partially surrounding the first EM rotor 66 and the second EM rotor 70. For the embodiment shown, the casing 78 supports rotation of the second EM rotor 70 through a casing bearing assembly positioned between the casing 78 and the second EM rotor 70. In such a manner, the casing bearing assembly may support rotation of the second EM rotor 70 in the second circumferential direction C2. For the embodiment shown, the casing 78 bearing assembly includes a first casing bearing 80 and a second casing bearing 82. The first casing bearing 80 is positioned on one side of the plurality of windings 72 of the second EM rotor 70 and the second casing bearing 82 his position on an opposite side of the windings 72 of the second EM rotor 70 along the axis 58. Further, for the embodiment shown, one of the first casing bearing 80 or second casing bearing 82 is configured as a ball bearing and the other of the first casing bearing 80 or second casing bearing 82 is configured as a roller bearing. More specifically, for the embodiment shown, the first casing bearing 80 is a ball bearing and the second casing bearing 82 is a roller bearings.

Referring still to FIG. 2, and as noted above, the drive system 50 includes the electric bus 60 and the power source 62 connected to the plurality of windings 72 via the electric bus 60. More specifically, for the embodiment shown, the electric machine 56 further includes a slip ring 84. The slip ring 84 electrically couples the plurality of windings 72 of the second EM rotor 70 of the electric machine 56 to the electric bus 60, therefore coupling the plurality of windings 72 of the second EM rotor 70 also to the power source 62. In such a manner, the slip ring 84 may facilitate a stationary to rotating electrical connection between the electric bus 60 and the electric machine 56. However, in other embodiments, any other suitable stationary to rotating electrical connection may be made.

It will also be appreciated that for the embodiment shown the electric machine 56 is configured as an electric motor configured to drive the first and second DS rotors 52, 54. More specifically, the first EM rotor 66 extends between a first end 86 and a second end 88 along the axis 58 and is configured for mechanical coupling to the first DS rotor 52 of the vehicle drive system 50 at the second end 88. Similarly, for the embodiment shown, the second EM rotor 70 extends between a first end 90 and a second end 92 along the axis 58 and is configured for mechanical coupling to the second DS rotor 54 of the vehicle drive system 50 at the second end 92.

Further, during operation of the drive system 50, the power source 62 may be configured to provide electrical power to the electric machine 56. The power source 62 may be one or more energy storage units, such as one or more batteries or battery packs. Additionally, or alternatively, the power source 62 may include a combustion engine driving an electric generator to generate electrical power to provide to the electric machine 56 via the electric bus 60. More specifically, the electrical power may be provided via the electric bus 60 and slip ring 84 to the plurality of windings 72 of the second EM rotor 70 of the electric machine 56. The electrical power provided to the plurality of windings 72 may drive the first EM rotor 66 in the first circumferential direction C1 by virtue of a differential torque generated between the first and second EM rotors 66, 70. Further, given that the second EM rotor 70 is rotatably coupled to both the first EM rotor 66 and the casing 78, the differential torque generated between the plurality of windings 72 of the second EM rotor 70 and the plurality of magnets 68 of the first EM rotor 66 may further drive the second EM rotor 70 in the second circumferential direction C2. In such a manner, it will be appreciated that the first circumferential direction C1 is opposite the second circumferential direction C2 for the embodiment shown. In such a manner, it will further be appreciated that the electric machine 56 may be configured to drive the first DS rotor 52 in the first circumferential direction C1 through rotation of the first EM rotor 66 and further may be configured to drive the second DS rotor 54 in the second circumferential direction C2 through rotation of the second EM rotor 70. Notably, for the embodiment shown, the electric machine 56 is configured to substantially completely drive the first and second DS rotors 52, 54.

Referring still to FIG. 2, it will be appreciated that the drive system 50 has one or more control elements, one or more sensors, etc. that may be operably coupled to the controller 64. Specifically, for the embodiment shown it will be appreciated that the first DS rotor 52 includes a plurality of first rotor blades 94 coupled thereto, and the vehicle drive system 50 includes a first pitch change mechanism 96 operably coupled to the plurality of first rotor blades 94 for changing a pitch of the plurality of first rotor blades 94. Similarly, for the embodiment shown the second DS rotor 54 includes a plurality of second rotor blades 98 coupled thereto, and the vehicle drive system 50 includes a second pitch change mechanism 100 operably coupled to the plurality of second rotor blades 98 for changing a pitch of the plurality of second rotor blades 98. Further for the embodiment shown, the vehicle drive system 50 includes a first sensor 102 for sensing an operational parameter of the first EM rotor 66, and a second sensor 104 for sensing an operational parameter of the second EM rotor 70. For example, the first sensor 102 may be configured for sensing a rotational speed of the first EM rotor 66, and the second sensor 104 may be configured for sensing a rotational speed of the second EM rotor 70. Although not shown, the vehicle drive system 50 may further include additional sensors for sensing, e.g., a temperature of one or more components of the electric machine 56, one or more operational conditions of the vehicle drive system 50 (such as a pitch of the plurality of first rotor blades 94, the plurality second rotor blades 98, or both), etc. As is depicted in phantom lines, each of the first pitch change mechanism 96, second pitch change mechanism 100, first sensor 102, and second sensor 104 are operably coupled to the controller 64 via a wireless communication network 106.

In such a manner, it will be appreciated that the controller 64 may be configured to receive data indicative of an operational condition of the drive system 50 and may make control decisions based on such received data. For example, the controller 64 may receive data regarding a rotational speed of the first EM rotor 66, the second EM rotor 70, or both, and may change a pitch of one or both of the plurality of first rotor blades 94 or plurality of second rotor blades 98 in response to such data. It will be appreciated that the pitch of the plurality of first rotor blades 94 and/or of the plurality of second rotor blades 98 may affect a load on the first EM rotor 66, the second EM rotor 70, or both, therefore affecting a rotational speed of the first EM rotor 66 relative to the second EM rotor 70.

Briefly, it will be appreciated the controller 64 generally includes one or more processor(s) 64A and one or more memory device(s) 64B. The one or more processor(s) 64A can include any suitable processing device, such as a microprocessor, microcontroller, integrated circuit, logic device, and/or other suitable processing device. The one or more memory device(s) 64B can include one or more computer-readable media, including, but not limited to, non-transitory computer-readable media, RAM, ROM, hard drives, flash drives, and/or other memory devices.

The one or more memory device(s) 64B can store information accessible by the one or more processor(s) 64A, including computer-readable instructions 64C that can be executed by the one or more processor(s) 64A. The instructions 64C can be any set of instructions that when executed by the one or more processor(s) 64A, cause the one or more processor(s) 64A to perform operations. In some embodiments, the instructions 64C can be executed by the one or more processor(s) 64A to cause the one or more processor(s) 64A to perform operations, such as any of the operations and functions for which the controller(s) 64 are configured, the operations described herein with reference to, e.g., method 300, and/or any other operations or functions of the one or more controller(s) 64. The instructions 64C can be software written in any suitable programming language or can be implemented in hardware. Additionally, and/or alternatively, the instructions 64C can be executed in logically and/or virtually separate threads on processor(s) 64A. The memory device(s) 64B can further store data 64D that can be accessed by the processor(s) 64A.

The controller(s) 64 can also include a network interface 64E used to communicate, for example, with the other components of drive system 50 (e.g., via a wired and/or wireless communication network, such as network 106), a vehicle including the drive system 50, etc. The network interface 64E can include any suitable components for interfacing with one or more network(s), including for example, transmitters, receivers, ports, controllers, antennas, and/or other suitable components. For example, in the embodiment shown, the network interface 64E is operable with components via the wireless communications network 106.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single controller or multiple controllers working in combination. Databases, memory, instructions, and applications can be implemented on a single system or distributed across multiple systems. Distributed components can operate sequentially or in parallel.

Figure 3:
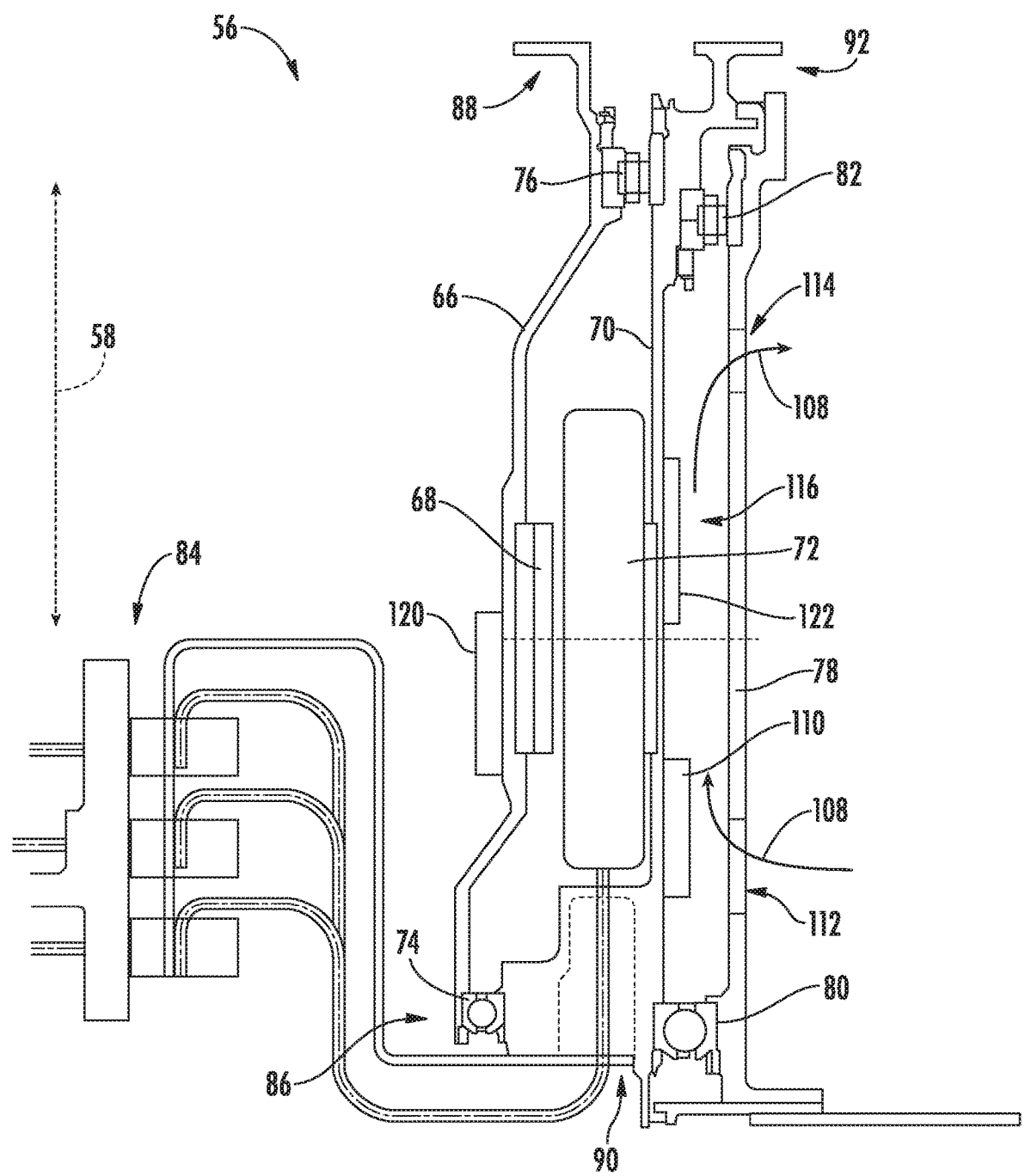
FIG. 3 is a close-up, schematic view of a section of an electric machine as may be incorporated into a drive system of an exemplary embodiment of the present disclosure.

Referring now to FIG. 3, providing a close-up view of a first EM rotor 66 and a second EM rotor 70 of an electric machine 56 in accordance an exemplary embodiment of the present disclosure, it will be appreciated that the electric machine 56 may include one or more thermal management features. In certain exemplary embodiments, the electric machine 56 of FIG. 3 may be configured in the same, or substantially the same, manner as the exemplary electric machine 56 of FIG. 2.

More specifically, for the embodiment shown, the second EM rotor 70 includes a plurality of airflow features for generating an airflow 108 between the second EM rotor 70 and the casing 78 during operation of the electric machine 56. For example, the airflow features may be one or more blades 110 positioned on a radially outer side of the second EM rotor 70 configured to generate the airflow 108 between the second EM rotor 70 and the casing 78 by virtue of a rotation of the second EM rotor 70 in the second circumferential direction C2. Further, as is shown, the casing 78 includes a first opening 112 and a second opening 114. The first opening 112 and second opening 114 of the casing 78 are spaced along the axis 58 of the electric machine 56. In such a manner, the first opening 112 may allow for a flow of ambient air (i.e., the airflow 108) into a cavity 116 defined between the second EM rotor 70 and the casing 78, and the second opening 114 may allow for the airflow 108, having accepted heat from the second EM rotor 70, to be exhausted out to ambient or elsewhere.

Further, the first EM rotor 66, the second EM rotor 70, or both may include one or more thermal management features.

More specifically, the first EM rotor 66 includes a first thermal management feature 120 on a radially inner side of the first EM rotor 66 and the second EM rotor 70 includes a second thermal management feature 122 on a radially outer side of the second EM rotor 70. The first thermal management feature 120 may be a plurality of fins extending generally along the axis 58 of the electric machine 56, and similarly, the second thermal management feature 122 may also be a plurality of fins extending generally along the axis 58 of the electric machine 56. Notably, however, in other embodiments, one or more of the fins may instead extend generally along the circumferential direction C, and further, in other embodiments, any other suitable thermal management features may be included.

Figure 4:
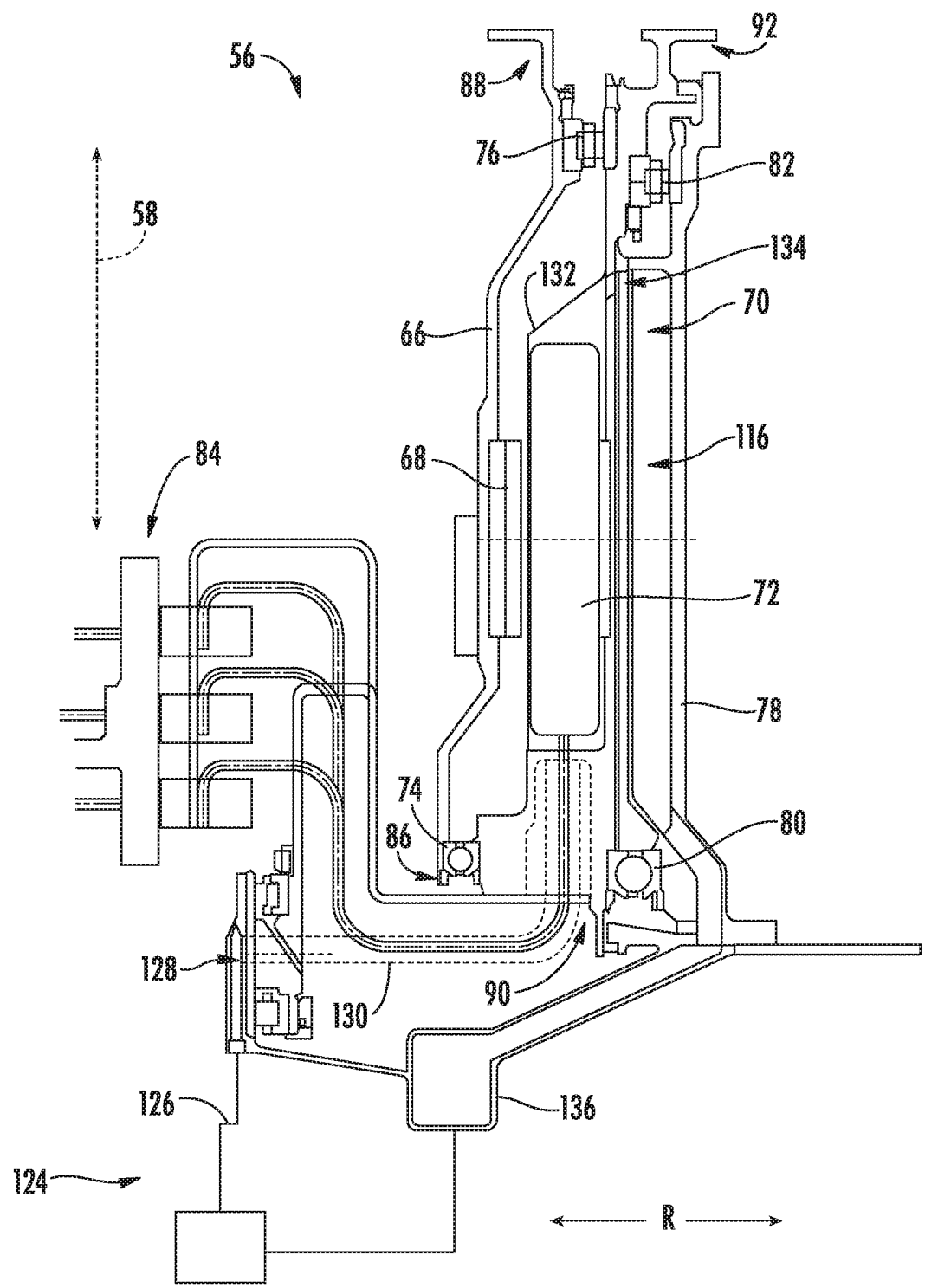
FIG. 4 is a close-up, schematic view of a section of an electric machine as may be incorporated into a drive system of another exemplary embodiment of the present disclosure.

For example, referring now briefly to FIG. 4, providing a close-up view of a first EM rotor 66 and a second EM rotor 70 of an electric machine 56 in accordance another exemplary embodiment of the present disclosure, it will be appreciated that the electric machine 56 may additionally, or alternatively, include a cooling oil system 124 to maintain the electric machine 56 within a desired thermal operating range.

The cooling oil system 124 generally includes a supply line 126 coupled to a stationary structure of the electric machine 56. The cooling oil system 124 further includes a stationary to rotating junction 128 for providing a cooling oil flow from the supply line 126 to the electric machine 56, and more particularly, to the second EM rotor 70 of the electric machine 56. The stationary to rotating junction 128 may include, e.g., guide vanes or other structure for turning the flow of cooling oil in the rotational direction of the second EM rotor 70. Further, the second EM rotor 70 includes a cooling oil duct 130 extending from the stationary to rotating junction 128 for providing the cooling oil flow around the plurality of windings 72. A cover 132 is provided with the second EM rotor 70 surrounding the plurality of windings 72 to define a sump surrounding the plurality windings 72. Further, the second EM rotor 70 defines an opening 134 to allow the cooling oil to flow therethrough and into the cavity 116 defined between the second EM rotor 70 and the casing 78. The cooling oil system 124 further includes a collector 136 for collecting the cooling oil from the cavity 116 between the second EM rotor 70 in the casing 78, which may be collected, processed (e.g., cooled), and returned to the cooling oil supply line 126.

It will be appreciated, however, that in other embodiments, any other suitable cooling oil system 124 or arrangement may be provided, and further that in other embodiments, any other suitable thermal management system may be utilized with the electric machine 56.

Moreover, it will be appreciated that although the exemplary electric machine 56 described above with reference to FIGS. 2 through 4 may be incorporated into a drive system 50 of a helicopter as an electric motor, in other embodiments of the present disclosure, the exemplary electric machine 56 may be incorporated into any other suitable drive system 50. For example, in other embodiments, the electric machine 56 may be incorporated into the drive system of any other aeronautical vehicle, such as an airplane, or alternatively may be incorporated into the drive system of a land-based vehicle, of an aquatic vehicle, of an engine (such as a gas turbine engine), a stationary machine, etc.

Figure 5:
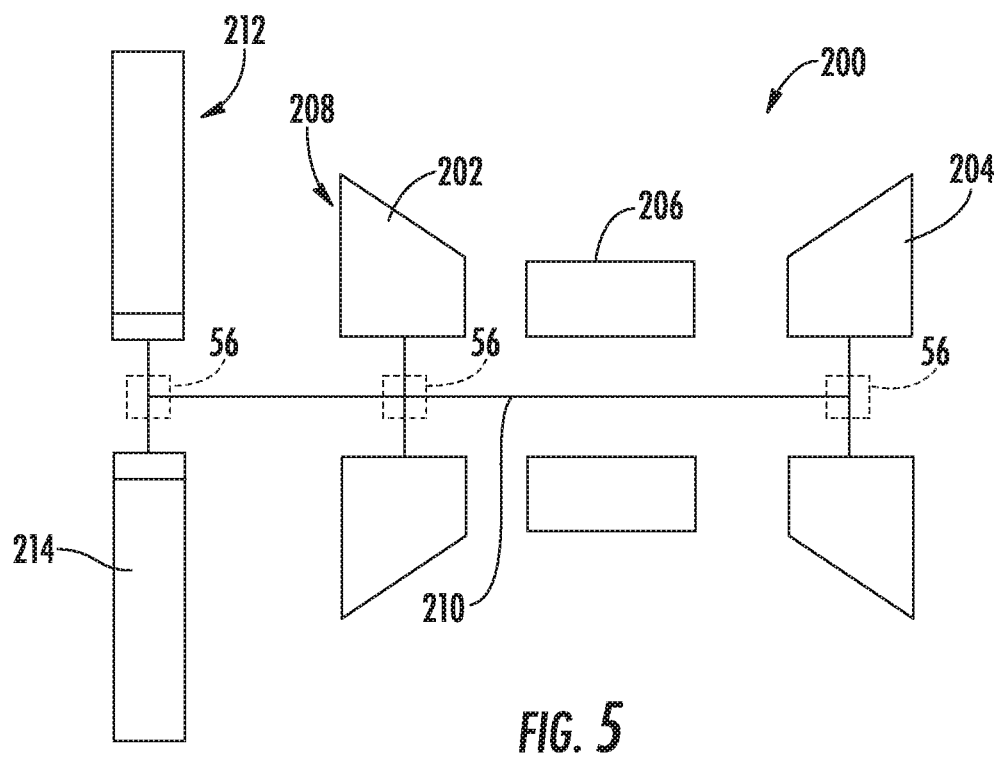
FIG. 5 is a schematic view of an engine in accordance with an exemplary embodiment of the present disclosure.

Referring briefly to FIG. 5, a schematic view is provided of an engine that may include an electric machine in accordance with an exemplary embodiment of the present disclosure in a drive system thereof. For the embodiment of FIG. 1, the engine is generally configured as a turbofan engine 200. More specifically, the turbofan engine 200 generally includes a compressor section 202, a turbine section 204, and a combustion section 206 located downstream of the compressor section 202 and upstream of the turbine section 204. During operation, an airflow may be provided to an inlet 208 of the compressor section 202, wherein such airflow is compressed through one or more compressors, each of which may include one or more stages of compressor rotor blades. As will be discussed in greater detail below, compressed air from the compressor section 202 may then be provided to the combustion section 206, wherein the compressed air may be mixed with a fuel and detonated to generate combustion products. The combustion products may then flow to the turbine section 204 wherein one or more turbines may extract kinetic/rotational energy from the combustion products. As with the compressor(s) within the compressor section 202, each of the turbine(s) within the turbine section 204 may include one or more stages of turbine rotor blades. The combustion products may then flow from the turbine section 204 through, e.g., an exhaust nozzle (not shown) to generate thrust for the turbofan engine 200.

As will be appreciated, rotation of the turbine(s) within the turbine section 204, generated by the combustion products, is transferred through one or more shafts or spools 210 to drive the compressor(s) within the compressor section 202. Additionally, for the embodiment depicted, the turbofan engine 200 includes a fan section 212 at a forward end. The fan section 212 includes a fan 214 that is also driven by the turbine section 204. More specifically, for the embodiment depicted, the one or more shafts or spools 210 mechanically connects to the fan 214 of the fan section 212 for driving the fan 214 of the fan section 212.

Further, as noted above, the turbofan engine 200 may include an electric machine in a drive system thereof (e.g., a system providing power/driving one or more components of the turbofan engine 200). For example, as is depicted schematically, the turbofan engine 200 may include an electric machine 56 coupled to the one or more spools 210 within the turbine section 204, coupled to the one or more spools 210 within the compressor section 202, positioned within the fan section 212 for driving the fan 214, or at any other suitable location. Notably, although depicted as being coupled to the one or more spools 210 in the embodiment shown, in other embodiments, the electric machine 56 may have any other suitable configuration (e.g., as a tip motor/generator, offset motor/generator, etc.).

It will also be appreciated that the turbofan engine 200 depicted schematically in FIG. 5 is provided by way of example only. In certain exemplary embodiments, the turbofan engine 200 may include any suitable number of compressors within the compressor section 202, any suitable number of turbines within the turbine section 204, and further may include any number of shafts or spools 210 appropriate for mechanically linking the compressor(s), turbine(s), and/or fans (such as fan 214). Similarly, in other exemplary embodiments, the turbofan engine 200 may include any suitable fan section 212, with a fan 214 thereof being driven by the turbine section 204 in any suitable manner. For example, in certain embodiments, the fan 214 may be directly linked to a turbine within the turbine section 204, or alternatively, may be driven by a turbine within the turbine section 204 across a reduction gearbox. Additionally, the fan 214 may be a variable pitch fan, a fixed pitch fan, a ducted fan (i.e., the turbofan engine 200 may include an outer nacelle surrounding the fan section 212), an un-ducted fan, or may have any other suitable configuration.

Figure 6:
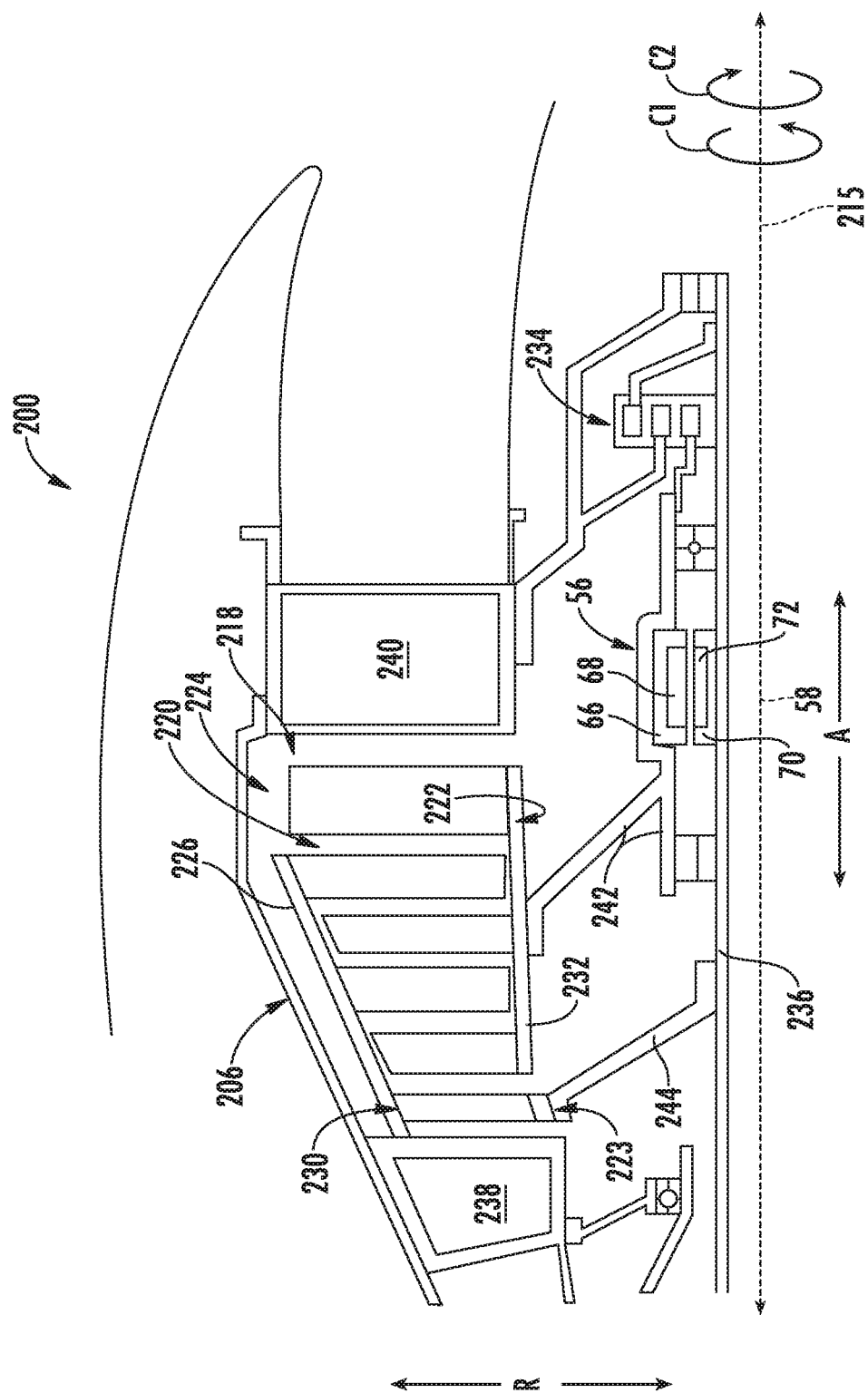
FIG. 6 is a schematic view of a turbine of an engine including an electric machine in accordance with an exemplary embodiment of the present disclosure.

Referring now to FIG. 6, a close-up, schematic view is depicted of a turbine 216 as may be incorporated into the turbine section 204 of the exemplary engine of FIG. 5. For the exemplary embodiment depicted, the turbine 216 defines a central axis 215 extending along an axial direction A, and includes a plurality of turbine rotor blades spaced along the axial direction A. More specifically, for the exemplary embodiment depicted, the turbine 216 includes a first plurality of turbine rotor blades 218 and a second plurality of turbine rotor blades 220.

Referring first to the first plurality of turbine rotor blades 218, each of the first plurality of turbine rotor blades 218 extends generally along a radial direction R2 between a radially inner end 222 and a radially outer end 224, and is coupled to one another at their respective radially outer ends 224 through an outer drum 226. Similarly, the second plurality of turbine rotor blades 220 each also extend generally along the radial direction R2 between a radially inner end 228 and a radially outer end 230, and are coupled to one another at their respective radially inner ends 228 through an inner drum 232. Notably, the inner drum 232 is depicted schematically, and in certain embodiments may include one or more rotor disks or other suitable structure.

Referring still to the embodiment depicted in FIG. 6, the first plurality of turbine rotor blades 218 and the second plurality of turbine rotor blades 220 are alternatingly spaced along the axial direction A. As used herein, the term "alternatingly spaced along the axial direction A" refers to the second plurality of turbine rotor blades 220 including at least one turbine rotor blade positioned along the axial direction A between two axially spaced turbine rotor blades of the first plurality of turbine rotor blades 218.

Moreover, for the embodiment depicted, the turbomachine further includes a gearbox 234 and a spool 236 (which may be one of the spools 210 described above with reference to FIG. 5), with the first plurality of turbine rotor blades 218 and the second plurality of turbine rotor blades 220 rotatable with one another through the gearbox 234. In at least certain exemplary embodiments, the spool 236 may be configured as a low pressure spool for driving the fan 214 described above with reference to FIG. 5.

More specifically, the exemplary turbine section further includes a turbine center frame 238 and a turbine rear frame 240, and the turbine section 206 includes a first support member 242 and a second support member 244. The first support member 242 couples the first plurality of turbine rotor blades 218 to the gearbox 234. In such a manner, the first plurality of turbine rotor blades 218 is coupled to the spool 236 through the support member 242 and the gearbox 234. Additionally, the second support member 244 similarly couples the second plurality of turbine rotor blades 220 to the spool 236 and the gearbox 234 (by way of the spool 236).

Briefly, it will be appreciated that the exemplary gearbox 234 depicted generally includes a first gear coupled to the first plurality of turbine rotor blades 218 (via support member 242), a second gear coupled to the second plurality of turbine rotor blades 220 (via spool 236), and a third gear coupled to the turbine rear frame 240. More specifically, for the embodiment depicted, the gearbox 234 is configured as a planetary gear box. In such a manner, it will be appreciated that for the embodiment depicted the first plurality of turbine rotor blades 218 are configured to rotate in an opposite direction than the second plurality of turbine rotor blades 220. For example, the first plurality of turbine rotor blades 218 may be configured to rotate in a first circumferential direction C1, while the second plurality of turbine rotor blades 220 may be configured to rotate in a second circumferential direction C2, opposite the first circumferential direction C1. It should be understood, however, that although the structures provided herein therefore enable the turbine 216 to "counter-rotate," in other embodiments, the turbine 216 may instead be configured to "co-rotate," wherein the first plurality of turbine rotor blades 218 and the second plurality of turbine rotor blades 220 each rotate the same circumferential direction C.

The exemplary engine depicted further includes an electric machine 56 in accordance with an exemplary embodiment of the present disclosure. The electric machine 56 defines an axis 58 that aligns with the axis 215 of the engine 200 depicted. Moreover, the electric machine 56 generally includes a first EM rotor 66 rotatable about the axis 58 in the first circumferential direction C1 and comprising a plurality of magnets 68, as well as a second EM rotor 70 rotatable about the axis 58 in the second circumferential direction C2 and including a plurality of windings 72 operably engaged with the plurality of magnets 68. The first EM rotor 66 is configured for mechanical coupling to a first drive system rotor/rotary component of the engine 200, and more specifically, is mechanically coupled to the first support member 242 and first plurality of rotor blades 218. Similarly, the second EM rotor 70 is configured for mechanical coupling to a second drive system rotor/rotary component of the engine 200, and more specifically, is mechanically coupled to the spool 236 and second plurality of rotor blades 220. Although not depicted, it will be appreciated that the electric machine 56 may be coupled to an electric bus for transferring electrical power to and/or from the electric machine 56.

In certain embodiments, the electric machine 56 may operate as an electric motor, such that electrical power is provided to the plurality of windings 72 of the second EM rotor 70, which may generate a differential torque between the first EM rotor 66 and the second EM rotor 70, generating additional mechanical power for the spool 236. Alternatively, however, the electric machine 56 may operate as an electric generator, such that mechanical power is extracted from the spool 236 and support member 242 and converted to electrical energy by the electric machine 56.

Figure 7:
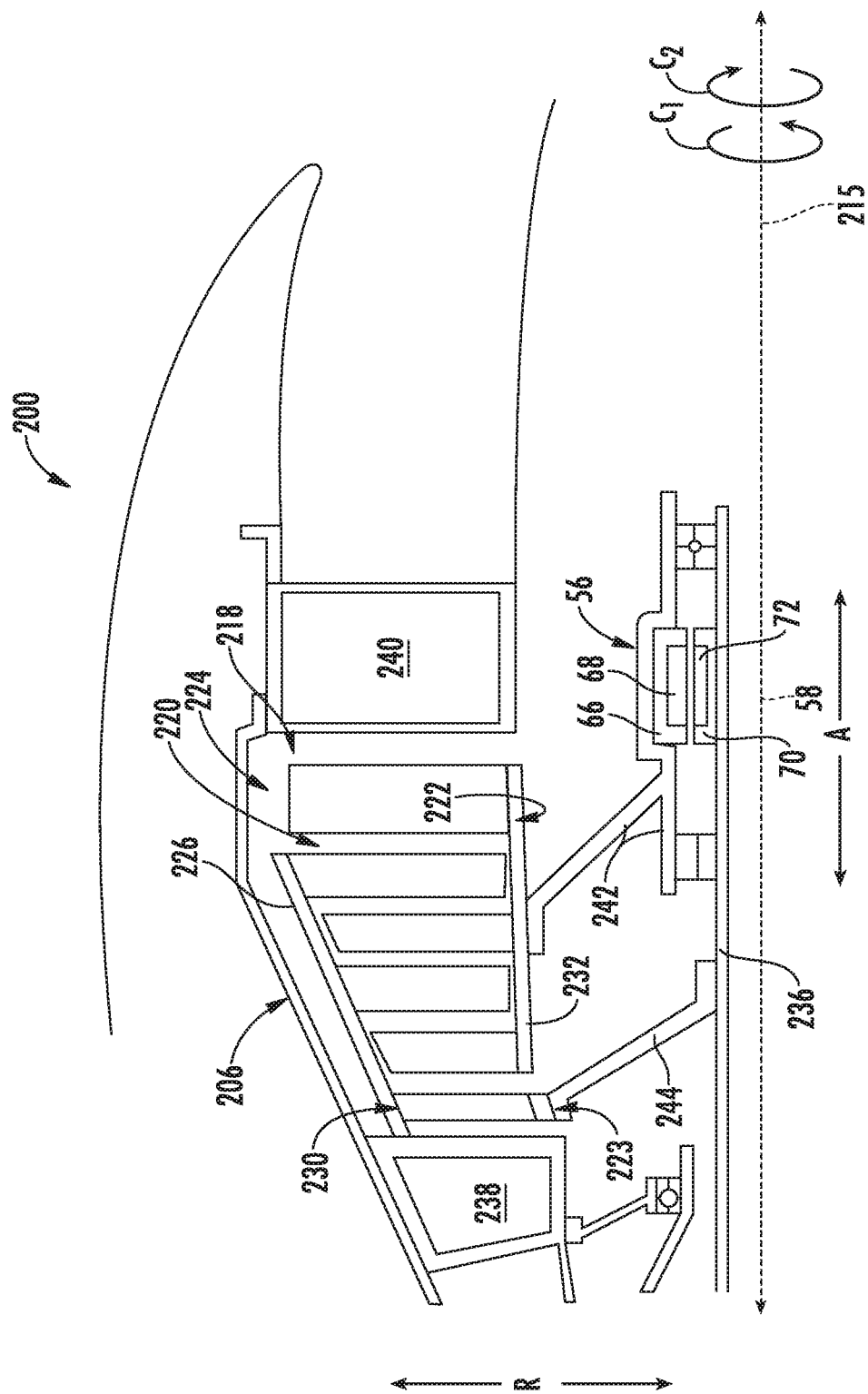
FIG. 7 is a schematic view of a turbine of an engine including an electric machine in accordance with another exemplary embodiment of the present disclosure.

It will be appreciated, however, that in other exemplary embodiments, the electric machine 56 may operate in any other suitable manner. For example, referring now briefly to FIG. 7, a turbine 206 of a turbine section of an engine 200 in accordance with another exemplary embodiment of the present disclosure is depicted. The exemplary turbine 206 depicted in FIG. 7 may be configured in substantially the same manner as exemplary turbine 206 of FIG. 6. However, for the embodiment of FIG. 7, the support member 242 is not coupled to the spool 236 through a gearbox (such as gearbox 234). Instead, for the embodiment of FIG. 7, the electric machine 56 may operate as the only torque transfer device between the spool 236 and support member 242.

In such a manner, it will be appreciated that the electric machine 56 may affect a differential rotational speed between the support member 242 and spool 236.

For example, the electric machine 56 may operate as an electric generator using the first EM rotor 66 (coupled to the support member 242) and the second EM rotor 70 (coupled to the spool 236) as mechanical power inputs, converting such mechanical power received to electrical power. The extraction of mechanical power between the first and second EM rotors 66, 70 of the electric machine 56 may reduce a differential rotational speed between the support member 242 and spool 236, and thus between the first plurality of turbine rotor blades 218 and second plurality of turbine rotor blades 220. Alternatively, the electric machine 56 may act as an electric generator with one of the first EM rotor 66 or the second EM rotor 70 acting as a mechanical power input, and the other of the first EM rotor 66 or the second EM rotor 70 receiving mechanical power as an output. In such a manner the electric machine 56, while converting some mechanical power input to electrical power, may transfer some of the mechanical power input from one rotor to the other rotor by virtue of the power extracted by the electric machine 56.

Alternatively, in other embodiments the electric machine 56 may operate as an electric motor, receiving electrical power and converting such electrical power to a mechanical power output. Such mechanical power output may be shared between the first and second EM rotors 66, 70 of the electric machine 56 as the electric machine applies a differential torque on both the first and second EM rotors 66, 70. Alternatively, however, the electric machine 56 may be configured to receive mechanical power from one of the first EM rotor 66 or the second EM rotor 70, and may transfer such received mechanical power (along with some electrical power converted to mechanical power) to the other of the first EM rotor 66 or the second EM rotor 70. For example, in certain embodiments, the first plurality of turbine rotor blades 218 may function as a mechanical power input, such that the mechanical power input from the first plurality of turbine rotor blades 218 (via the support member 242) is combined with a differential torque generated by the electric machine 56 and provided to the spool 236. Such may facilitate the spool 236 driving, e.g., a fan, a low pressure compressor, etc.

Accordingly, it will be appreciated from the discussion herein, that the electric machine 56 may generally be operable between: (1) a standard electric motor mode (wherein electrical power is provided to the electric machine 56 and such electrical power is converted into mechanical work split between the first and second EM rotors 66, 70); (2) a standard electric generator method (wherein mechanical power provided through the first and second EM rotors 66, 70 is converted into electrical power); (3) a hybrid electric motor mode (wherein mechanical power is provided through one of the first or second EM rotors 66, 70 and combined with a differential mechanical torque created by the conversion of electrical power to mechanical power by the electric machine 56, with the combined mechanical power provided to the other of the first or second EM rotors 66, 70); and (4) a hybrid electric generator mode (wherein mechanical power is provided through one of the first or second EM rotors 66, 70, a portion of such mechanical power is converted to electrical power by the electric machine 56, and the remaining mechanical power is transferred to the other of the first or second EM rotors 66, 70). In each of these operational modes, the first and second rotors 66, 70 may rotate in the same circumferential direction (at different speed), or alternatively may rotate in opposite circumferential directions.

Notably, in the latter case, it will be appreciated that the differential rotational speed between the two rotors 66, 70 will be greater than the absolute rotational speed of either of the rotors 66, 70 individually, which may result in an overall more efficient electric machine 56. For example, when implemented in the helicopter embodiment discussed above, each of the main rotor assemblies 52, 54 may be required to rotate at an absolute rotational speed of between about 100 revolutions per minute ("RPM") and about 550 RPM. As such, the differential rotational speed between the two rotors 66, 70 of the electric machine 56 may be between about 200 RPM and 1,100 RPM, potentially leading to a more efficient electric machine 56.

Referring now to FIGS. 8 through 11, various exemplary aspects of a method 300 of operating an electric machine in accordance with the present disclosure are provided. In certain exemplary aspects, the method 300 may be utilized to operate an electric machine for a drive system having a first DS rotor and a second DS rotor. The electric machine and/or drive system may be configured in accordance with one or more of the exemplary electric machines and drive systems described above with reference to FIGS. 1 through 7.

For the exemplary aspect depicted, the method 300 includes at (302) rotating a first EM rotor of the electric machine in a first circumferential direction, the first EM rotor coupled to the first DS rotor and comprising a plurality of magnets. Additionally, the method 300 includes at (304) rotating a second EM rotor of the electric machine in a second circumferential direction, the second EM rotor coupled to the second DS rotor and comprising a plurality of windings. Further, the method 300 includes at (306) transferring electrical power to or from the electric machine as a result of rotating the first EM rotor in the first circumferential direction and rotating the second EM rotor in the second circumferential direction.

Figure 8:
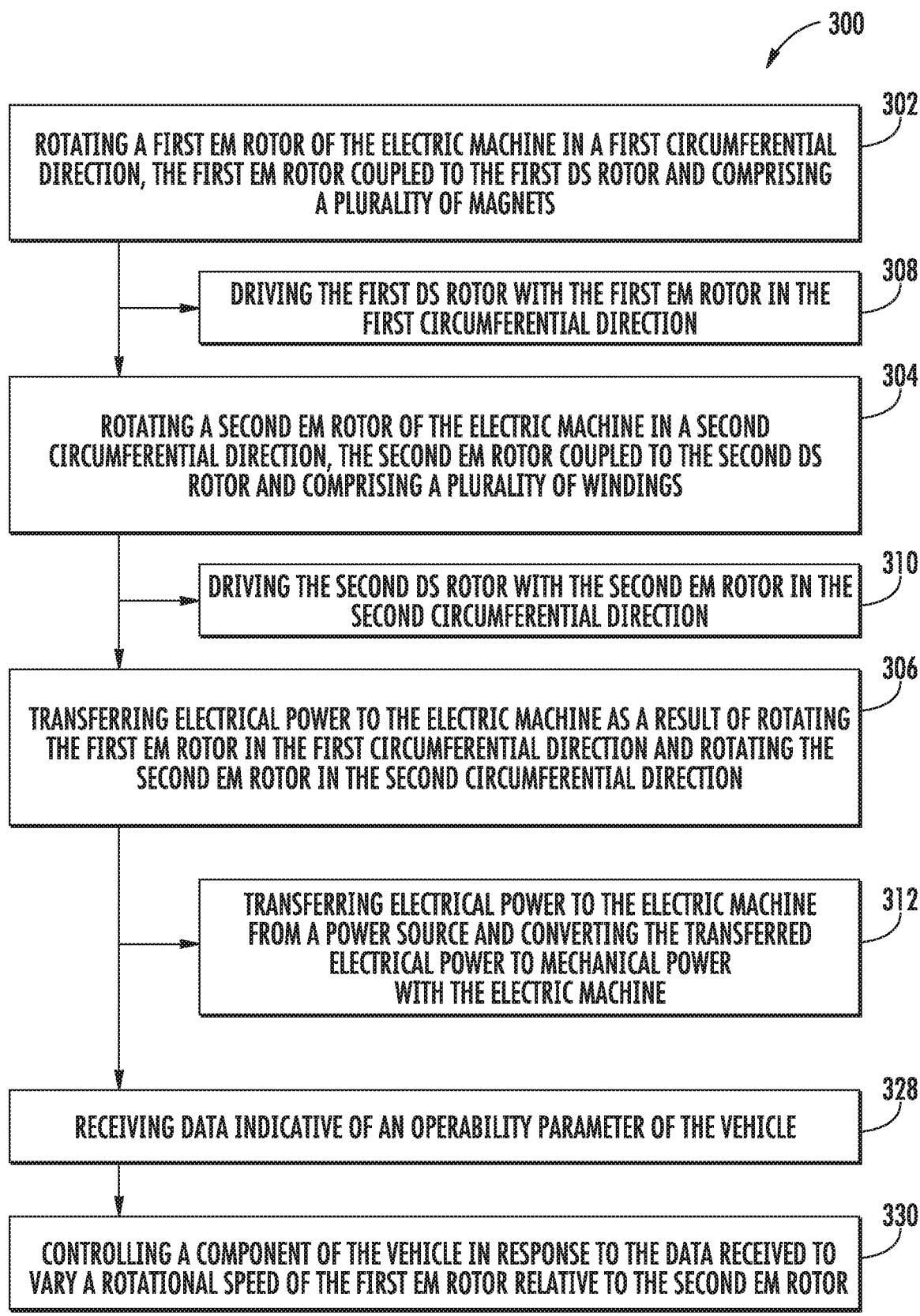
FIG. 8 is a flow diagram of a method for operating an electric machine in accordance with an exemplary aspect of the present disclosure.
Figure 9:
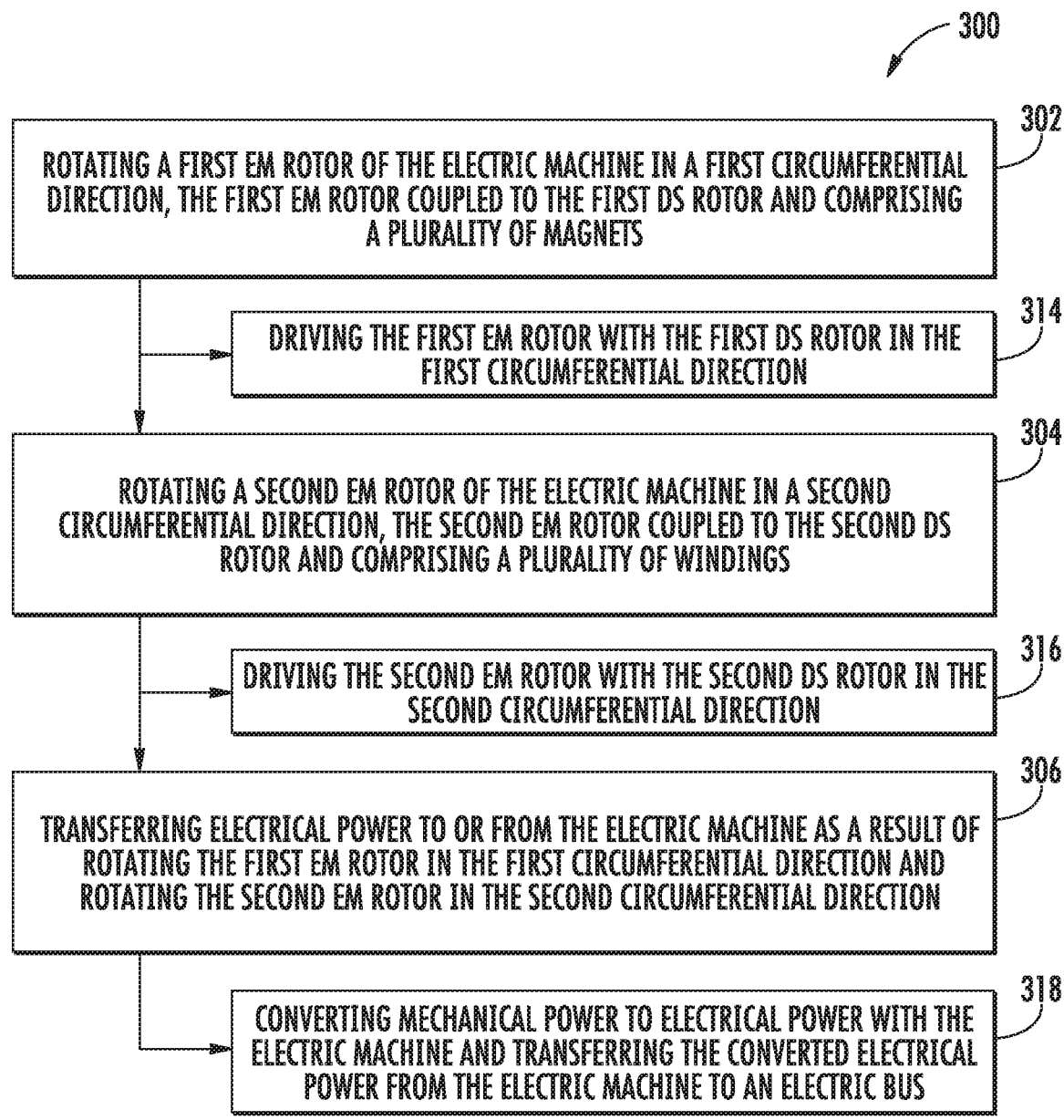
FIG. 9 is a flow diagram of a method for operating an electric machine in accordance with another exemplary aspect of the present disclosure.

Referring particularly to the exemplary aspect of the method 300 depicted in FIG. 8, the electric machine is operated as a purely electric motor. For example, with such an exemplary aspect, rotating the first EM rotor in the first circumferential direction at (302) includes at (308) driving the first DS rotor with the first EM rotor in the first circumferential direction, and rotating the second EM rotor in the second circumferential direction at (304) includes at (310) driving the second DS rotor with the second EM rotor in the second circumferential direction. Further, with such an exemplary aspect, transferring electrical power to or from the electric machine (306) includes at (312) transferring electrical power to the electric machine from a power source and converting the transferred electrical power to mechanical power with the electric machine.

However, in other exemplary aspects, the electric machine may instead be operated as a purely electric generator. For example, referring particularly to the exemplary aspect of the method 300 depicted in FIG. 9, rotating the first EM rotor in the first circumferential direction at (302) includes at (314) driving the first EM rotor with the first DS rotor in the first circumferential direction, and rotating the second EM rotor in the second circumferential direction at (304) includes at (316) driving the second EM rotor with the second DS rotor in the second circumferential direction. With such an exemplary aspect, transferring electrical power to or from the electric machine at (306) includes at (318) converting mechanical power to electrical power with the electric machine and transferring the converted electrical power from the electric machine to an electric bus.

In other exemplary aspects of the present disclosure, however, the electric machine may instead be operated as a hybrid electric generator, a hybrid electric motor, or both. For example, referring particularly to the exemplary aspect of the method 300 depicted in FIG. 10, rotating the first EM rotor in the first circumferential direction at (302) includes at (320) driving the first DS rotor with the first EM rotor in the first circumferential direction, and rotating the second EM rotor in the second circumferential direction at (304) includes at (322) driving the second EM rotor with the second DS rotor in the second circumferential direction. Alternatively, referring particularly to the exemplary aspect of the method 300 depicted in FIG. 11, rotating the first EM rotor in the first circumferential direction at (302) includes at (324) driving the first EM rotor with the first DS rotor in the first circumferential direction, and rotating the second EM rotor in the second circumferential direction at (304) includes at (326) driving the second DS rotor with the second EM rotor in the second circumferential direction.

Figure 10:
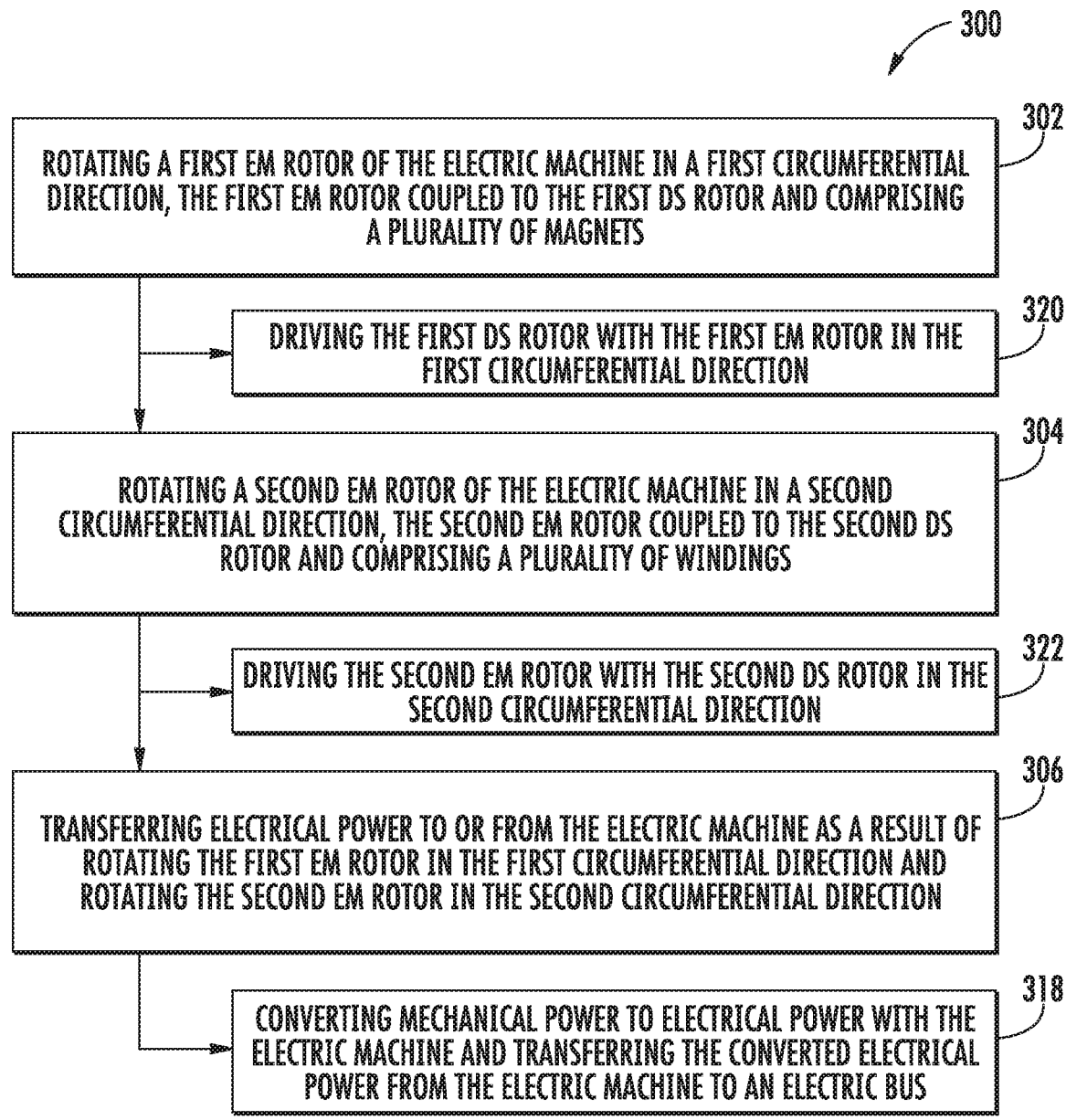
FIG. 10 is a flow diagram of a method for operating an electric machine in accordance with yet another exemplary aspect of the present disclosure.
Figure 11:
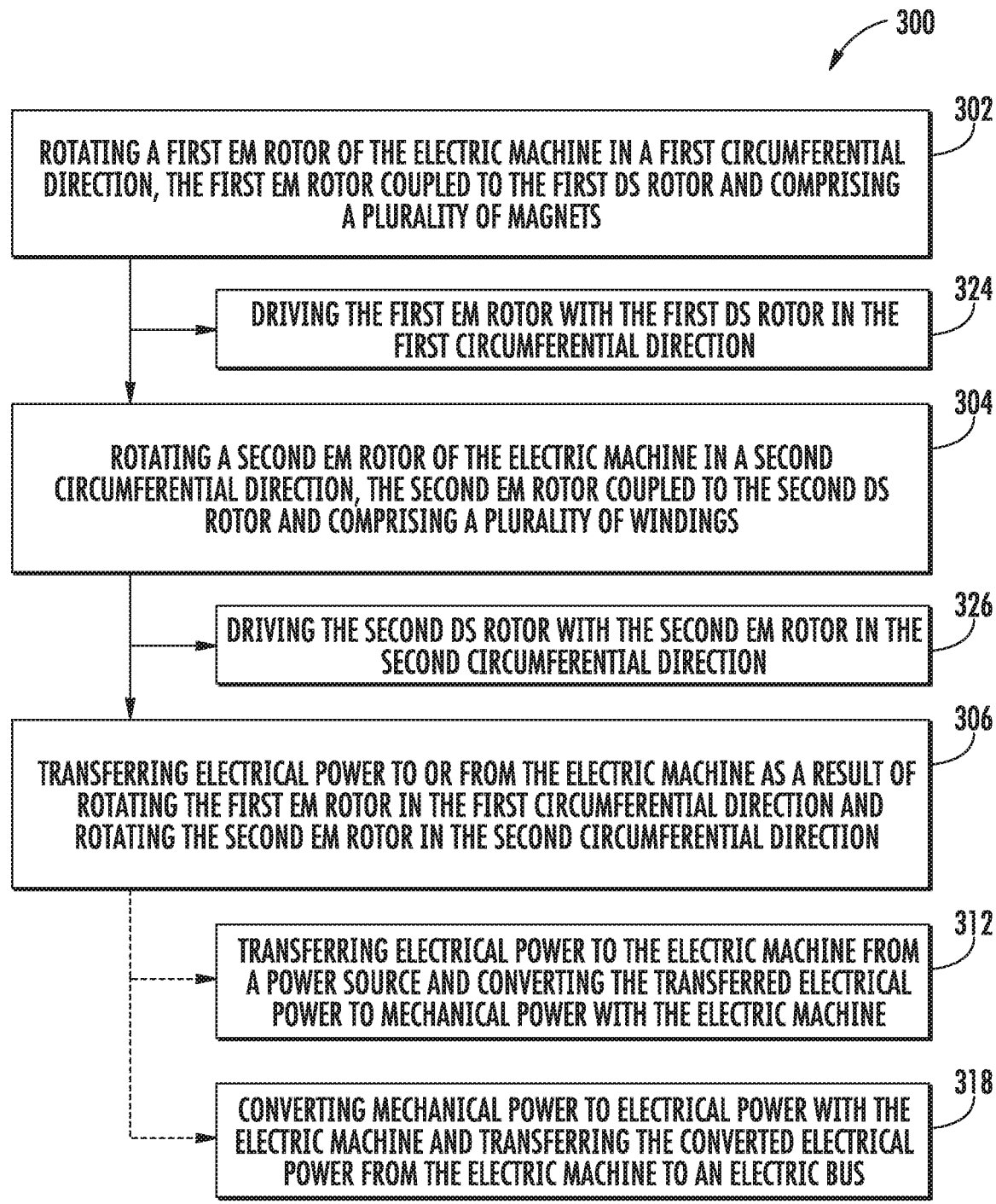
FIG. 11 is a flow diagram of a method for operating an electric machine in accordance with still another exemplary aspect of the present disclosure.

With each of the exemplary aspects of the method 300 depicted in FIGS. 10 and 11, transferring electrical power to or from the electric machine (306) may include transferring electrical power to the electric machine from a power source and converting the transferred electrical power to mechanical power with the electric machine at (312), converting mechanical power to electrical power with the electric machine and transferring the converted electrical power from the electric machine to the electric bus at (318), or both.

Further, referring back particularly to FIG. 8, it will be appreciated that in at least certain exemplary aspects, the method 300 may receive data indicative of one or more operability parameters of the vehicle incorporating the electric machine, and may make one or more control decisions based on the received data.

Specifically, for the exemplary aspect depicted in FIG. 8, the method 300 includes at (328) receiving data indicative of an operability parameter of the vehicle. The operability parameter the vehicle may include, e.g., a rotational speed of the first DS rotor, a pitch of a plurality of rotor blades of the first DS rotor, a rotational speed of the second DS rotor, a pitch of a plurality of rotor blades of the second DS rotor, a rotational speed of the first EM rotor, a rotational speed of the second EM rotor, etc.

As is also depicted in FIG. 8, the method 300 further includes at (330) controlling a component of the vehicle in response to the data received at (328) to vary a rotational speed of the first EM rotor relative to the second EM rotor (and accordingly to vary a rotational speed of the first DS rotor relative to the second DS rotor). In certain exemplary aspects, controlling the component of the vehicle at (330) may include changing a pitch of the plurality of rotor blades of the first DS rotor, changing the pitch of the plurality of rotor blades of the second DS rotor, varying (e.g., increasing or decreasing) an amount of electrical power provided to the electric machine, varying (e.g., increasing or decreasing) an amount of electrical power extracted from the electric machine), or a combination of two or more of the foregoing. In such a manner, the method 300 may affect a rotational speed of the first EM rotor relative to the second EM rotor based on, e.g., one or more operability parameters of the electric machine and/or vehicle incorporating the electric machine.

Further aspects of the invention are provided by the subject matter of the following clauses:

An electric machine for a drive system having a first DS rotor and a second DS rotor, the electric machine defining an axis and comprising: a first EM rotor rotatable about the axis in a first circumferential direction and comprising a plurality of magnets, the first EM rotor configured for mechanical coupling to the first DS rotor; and a second EM rotor rotatable about the axis in a second circumferential direction and comprising a plurality of windings, the second EM rotor configured for mechanical coupling to the second DS rotor and the plurality of magnets of the first EM rotor operably engaged with the plurality of windings of the second EM rotor.

The electric machine of any preceding clause, wherein the plurality of magnets and the plurality of windings are aligned along the axis of the electric machine.

The electric machine of any preceding clause, wherein the electric machine further defines a radial direction, and wherein the plurality of magnets of the first EM rotor are positioned inward of the plurality of windings of the second EM rotor along the radial direction.

The electric machine of any preceding clause, wherein the electric machine further defines a radial direction, and wherein the electric machine further comprises: a casing located outward of the first EM rotor and the second EM rotor along the radial direction and at least partially surrounding the first EM rotor and the second EM rotor.

The electric machine of any preceding clause, further comprising: a bearing assembly positioned between the casing and the second EM rotor for supporting a rotation of the second EM rotor in the second circumferential direction relative to the casing.

The electric machine of any preceding clause, wherein the second EM rotor includes a plurality of airflow features for generating an airflow between the second EM rotor and the casing during operation of the electric machine.

The electric machine of any preceding clause, further comprising: an electric bus; and a slip ring electrically coupling the plurality of windings of the second EM rotor to the electric bus.

The electric machine of any preceding clause, further comprising: a first differential bearing positioned between the first EM rotor and the second EM rotor at a first position along the axis; and a second differential bearing positioned between the first EM rotor and the second EM rotor at a second position along the axis, wherein the first position and the second position are on opposite sides of the plurality of magnets and the plurality of windings from one another.

The electric machine of any preceding clause, wherein the drive system is a vehicle drive system for a vehicle, wherein the vehicle is a helicopter, wherein the first DS rotor is a first main rotor of the helicopter, wherein the second DS rotor is a second main rotor of the helicopter, and wherein the electric machine is configured as an electric motor for substantially completely driving the first and second main rotors of the helicopter.

The electric machine of any preceding clause, further comprising: a thermal management feature coupled to the first EM rotor or the second EM rotor.

The electric machine of any preceding clause, further comprising: a cooling oil system comprising a stationary to rotating junction for providing a cooling oil flow to the second EM rotor.

The electric machine of any preceding clause, wherein the electric machine is an electric motor configured to drive the first DS rotor in the first circumferential direction and the second DS rotor in the second circumferential direction.

The electric machine of any preceding clause, wherein the first circumferential direction is opposite the second circumferential direction.

The electric machine of any preceding clause, wherein the first circumferential direction is the same as the second circumferential direction.

A method of operating an electric machine for a drive system having a first DS rotor and a second DS rotor, the method comprising: rotating a first EM rotor of the electric machine in a first circumferential direction, the first EM rotor coupled to the first DS rotor and comprising a plurality of magnets; rotating a second EM rotor of the electric machine in a second circumferential direction, the second EM rotor coupled to the second DS rotor and comprising a plurality of windings; and transferring electrical power to or from the electric machine as a result of rotating the first EM rotor in the first circumferential direction and rotating the second EM rotor in the second circumferential direction.

The method of any preceding clause, wherein rotating the first EM rotor in the first circumferential direction comprises driving the first DS rotor with the first EM rotor in the first circumferential direction, and wherein rotating the second EM rotor in the second circumferential direction comprises driving the second DS rotor with the second EM rotor in the second circumferential direction.

The method of any preceding clause, wherein rotating the first EM rotor in the first circumferential direction comprises driving the first EM rotor with the first DS rotor in the first circumferential direction, and wherein rotating the second EM rotor in the second circumferential direction comprises driving the second EM rotor with the second DS rotor in the second circumferential direction.

The method of any preceding clause, wherein rotating the first EM rotor in the first circumferential direction comprises driving the first DS rotor with the first EM rotor in the first circumferential direction, and wherein rotating the second EM rotor in the second circumferential direction comprises driving the second EM rotor with the second DS rotor in the second circumferential direction.

The method of any preceding clause, wherein rotating the first EM rotor in the first circumferential direction comprises driving the first EM rotor with the first DS rotor in the first circumferential direction, and wherein rotating the second EM rotor in the second circumferential direction comprises driving the second DS rotor with the second EM rotor in the second circumferential direction.

The method of any preceding clause, further comprising: receiving data indicative of an operability parameter of a vehicle incorporating the drive system; and controlling a component of the vehicle in response to the data received to vary a rotational speed of the first EM rotor relative to the second EM rotor.

This written description uses examples to disclose the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electric machine (EM) for a drive system (DS) having a first DS rotor and a second DS rotor, the electric machine defining an axis and comprising:
    a first EM rotor rotatable about the axis in a first circumferential direction and comprising a plurality of magnets, the first EM rotor configured for mechanical coupling to the first DS rotor; and
    a second EM rotor rotatable about the axis in a second circumferential direction and comprising a plurality of windings, the second EM rotor configured for mechanical coupling to the second DS rotor and the plurality of magnets of the first EM rotor operably engaged with the plurality of windings of the second EM rotor; and
    a first differential bearing positioned between the first EM rotor and the second EM rotor at a first position along the axis; and
    a second differential bearing positioned between the first EM rotor and the second EM rotor at a second position along the axis, wherein the first position and the second position are on opposite sides of the plurality of magnets and the plurality of windings from one another.

2. The electric machine of claim 1, wherein the plurality of magnets and the plurality of windings are aligned along the axis of the electric machine.

3. The electric machine of claim 1, wherein the electric machine further defines a radial direction, and wherein the plurality of magnets of the first EM rotor are positioned inward of the plurality of windings of the second EM rotor along the radial direction.

4. The electric machine of claim 1, wherein the electric machine further defines a radial direction, and wherein the electric machine further comprises:
a casing located outward of the first EM rotor and the second EM rotor along the radial direction and at least partially surrounding the first EM rotor and the second EM rotor.

5. The electric machine of claim 4, further comprising:
a bearing assembly positioned between the casing and the second EM rotor for supporting a rotation of the second EM rotor in the second circumferential direction relative to the casing.

6. The electric machine of claim 4, wherein the second EM rotor includes a plurality of airflow features for generating an airflow between the second EM rotor and the casing during operation of the electric machine.

7. The electric machine of claim 1, further comprising:
an electric bus; and
a slip ring electrically coupling the plurality of windings of the second EM rotor to the electric bus.

8. The electric machine of claim 1, wherein the drive system is a vehicle drive system for a vehicle, wherein the vehicle is a helicopter, wherein the first DS rotor is a first main rotor of the helicopter, wherein the second DS rotor is a second main rotor of the helicopter, and wherein the electric machine is configured as an electric motor for substantially completely driving the first and second main rotors of the helicopter.

9. The electric machine of claim 1, further comprising:
a thermal management feature coupled to the first EM rotor or the second EM rotor.

10. The electric machine of claim 1, wherein the electric machine is an electric motor configured to drive the first DS rotor in the first circumferential direction and the second DS rotor in the second circumferential direction.

11. The electric machine of claim 1, wherein the first circumferential direction is opposite the second circumferential direction.

12. The electric machine of claim 1, wherein the first circumferential direction is the same as the second circumferential direction.

13. A method of operating an electric machine (EM) for a drive system (DS) having a first DS rotor and a second DS rotor, the method comprising:
rotating a first EM rotor of the electric machine in a first circumferential direction, the first EM rotor coupled to the first DS rotor and comprising a plurality of magnets;
rotating a second EM rotor of the electric machine in a second circumferential direction, the second EM rotor coupled to the second DS rotor and comprising a plurality of windings, a first differential bearing is positioned between the first EM rotor and the second EM rotor at a first position along an axis defined by the electric machine, and a second differential bearing is positioned between the first EM rotor and the second EM rotor at a second position along the axis, wherein the first position and the second position are on opposite sides of the plurality of magnets and the plurality of windings from one another; and
transferring electrical power to or from the electric machine as a result of rotating the first EM rotor in the first circumferential direction and rotating the second EM rotor in the second circumferential direction.

14. The method of claim 13, wherein rotating the first EM rotor in the first circumferential direction comprises driving the first DS rotor with the first EM rotor in the first circumferential direction, and wherein rotating the second EM rotor in the second circumferential direction comprises driving the second DS rotor with the second EM rotor in the second circumferential direction.

15. The method of claim 13, wherein rotating the first EM rotor in the first circumferential direction comprises driving the first EM rotor with the first DS rotor in the first circumferential direction, and wherein rotating the second EM rotor in the second circumferential direction comprises driving the second EM rotor with the second DS rotor in the second circumferential direction.

16. The method of claim 13, wherein rotating the first EM rotor in the first circumferential direction comprises driving the first DS rotor with the first EM rotor in the first circumferential direction, and wherein rotating the second EM rotor in the second circumferential direction comprises driving the second EM rotor with the second DS rotor in the second circumferential direction.

17. The method of claim 13, wherein rotating the first EM rotor in the first circumferential direction comprises driving the first EM rotor with the first DS rotor in the first circumferential direction, and wherein rotating the second EM rotor in the second circumferential direction comprises driving the second DS rotor with the second EM rotor in the second circumferential direction.

18. The method of claim 13, further comprising:
receiving data indicative of an operability parameter of a vehicle incorporating the drive system; and
controlling a component of the vehicle in response to the data received to vary a rotational speed of the first EM rotor relative to the second EM rotor.

19. An electric machine (EM) for a drive system (DS) having a first DS rotor and a second DS rotor, the electric machine defining an axis and comprising:
a first EM rotor rotatable about the axis in a first circumferential direction and comprising a plurality of magnets, the first EM rotor configured for mechanical coupling to the first DS rotor; and
a second EM rotor rotatable about the axis in a second circumferential direction and comprising a plurality of windings, the second EM rotor configured for mechanical coupling to the second DS rotor and the plurality of magnets of the first EM rotor operably engaged with the plurality of windings of the second EM rotor; and
a cooling oil system having a stationary to rotating junction for providing a cooling oil flow to the second EM rotor, wherein the stationary to rotating junction includes guide vanes for turning the flow of cooling oil in the second circumferential direction of the second EM rotor.

* * * * *